UNITED STATES PATENT OFFICE 2,046,088

WELDING ROD

William B. Price, Waterbury, Conn., assignor to Scovill Manufacturing Company, Waterbury, Conn., a corporation of Connecticut No Drawing. Application April 8, 1936, Serial No. 73,370

4 Claims. (Cl. 219—8)

This invention relates to welding rods; and it comprises a non-fuming brass welding rod having in solid solution in the brass thereof a small amount of chromium; the amount in solid solution so occurring being ordinarily of the order of 0.01 to 0.1 per cent; all as more fully hereinafter set forth and as claimed.

Brass welding rods are in common use for fusion welding, brazing and like work; being on the market in the form of rods cut to lengths. The composition of the brass used varies according to the particular results desired but a composition containing copper and zinc in a 60:40 ratio is frequently employed. The brass may contain small quantities of other metals, such as tin, nickel, iron, manganese, etc. to adjust the fusing point, the fluidity of molten metal, the strength and resistance to abrasion of the joint, etc.

All these brass welding rods have the inconvenience in use of producing annoying fumes; a fume of zinc oxide. Just how this fume is produced is not clearly evident but apparently it is due to a preliminary evaporation of metallic zinc as vapor with subsequent burning to zinc oxide in the air. The zinc fume apparently comes directly from the surface of the welding rod as it melts in use.

I have found that by addition to the brass welding rods of an extremely small amount of the metal chromium, I can restrain the development of fume from brass welding rods in brazing and welding. The chromium acts as a deoxidizer and degasifier, eliminating occluded gases from the molten metal. It is effective in preventing the formation of zinc oxide fume.

The nature of the actions functioning in restraining development of fume is not entirely clear. They may be due to surface tension phenomena related to the presence of a more oxidizable metal than zinc in the outer surface of the rod. The alloying chromium held in solid solution may reduce the vapor pressure of the zinc. It may form a molecular film upon the molten surface and thus restrain volatilization of the metallic zinc. Whatever the reason, the result is as stated: the presence of a minimum quantity of chromium in a brass welding rod prevents fuming in use.

The amount of chromium required to produce this result is extraordinarily small. The presence of chromium in amounts ranging between 0.01 and 0.1 per cent in the metal forming a brass welding rod effectively restrains fuming. These amounts approach the limit of solubility of chromium in brass; the amount which will go into a eutectic. Chromium is considerably more soluble in molten copper than in brass and the use of copper-chromium compositions is a convenient way of putting the chromium into the brass. The solubility of chromium in brass varies considerably with the composition of the brass, but the stated upper limiting amount 0.1 per cent probably comes near the saturation point. Any additional chromium added to the brass is usually in excess of that held in solid solution. The excess has no particular influence on the fuming and is not necessary. It is chromium in solid solution, that is, forming a homogeneous alloy, that restrains fuming. It is not altogether easy to reach the saturation point in a brass without excess of chromium above that held in solution; but it is possible conveniently to get into solution 0.088 per cent chromium in an 80—20 brass, that is a brass containing 80 per cent of copper, and 0.075 per cent in a 60—40 brass.

In making a brass welding rod under the present invention, the brass is melted and made in an electric furnace and a little metallic chromium added to the melt. In an electric furnace the eddy currents give sufficient agitation to secure easy and speedy incorporation. While metallic chromium may be added in various forms a convenient source is commercial cupro-chromium; an alloy of copper and chromium. Or mechanical mixtures of powdered copper and chromium may be used, advantageously in the form of pressed pellets containing 85 Cu:15 Cr. The presence of the copper assists in effecting a solution of chromium in the brass. After the addition of the chromium and homogenization of the melt, it is converted into rods and wire by the usual methods employed in making brass welding rods. The welding rod is ordinarily furnished in rod form cut to lengths. A common size is 3/8 inch diameter four feet long.

In welding or brazing of metal articles, the new welding rod is used in an ordinary manner but there is a difference in action in that in use there is no development of fumes of zinc oxide. Chromium in the amounts used has no injurious action in welding and brazing; it does not tend to form slags, nor to produce non-metallic inclusions and porosity in the joints.

Typical brass welding rods containing chromium to restrain fuming having shown the following analyses:

| Copper | Lead | Iron | Zinc (by difference) | Other elements | | |
|---|---|---|---|---|---|---|
| 64.02 | .01 | -------- | 35.757 | .053 Cr | .16 Sn | |
| 62.32 | .01 | -------- | 37.460 | .030 Cr | .16 Sn | |
| 61.43 | .01 | -------- | 38.465 | .075 Cr | | |
| 61.21 | .01 | -------- | 38.719 | .051 Cr | .84 Sn | |
| 61.32 | .01 | -------- | 37.972 | .058 Cr | .63 Sn | |
| 60.40 | .01 | .62 | 38.595 | .055 Cr | .23 Ni | .09 Sn |
| .60.20 | .01 | .98 | 38.206 | .034 Cr | .47 Ni | |
| 61.29 | .01 | .93 | 37.177 | .053 Cr | .54 Ni | |
| 61.32 | -------- | .02 | 38.66 | Less than .051 Cr | .001 Cr | |
| 57.60 | -------- | .03 | 42.319 | | | |
| 60.00 | -------- | 1.00 | 38.80 | .15 Mn | .05 Cr | |
| 60.00 | -------- | 1.00 | 38.75 | .15 Mn | .05 Cr | .05 Si |
| 60.00 | -------- | -------- | 39.10 | .75 Sn | .10 Mn | .05 Cr |
| 60.00 | -------- | -------- | 38.85 | 1.00 Ni | .10 Mn | .05 Cr |

All the welding rods of the analyses given are non-fuming in use. Copper, as will be noted, ranges between 58 and 64 per cent, zinc constituting most of the residual percentage. The fume-restraining chromium is sometimes present in solid solution in amounts which analytically could be regarded as mere "traces" but which are nevertheless sufficient to give the non-fuming property.

What I claim is:—

1. A non-fuming brass welding rod containing in solid solution in the brass sufficient chromium to restrain fuming in use of the brass rod for welding.

2. The non-fuming rod of claim 1 in which the chromium is in an amount between 0.01 and 0.10 per cent.

3. A brass welding rod containing copper and zinc in about a 60:40 ratio and also containing chromium in solid solution in an amount between 0.01 and 0.10 per cent.

4. A brass welding rod containing from 58 to 64 per cent copper with the balance predominantly zinc and also containing chromium in solid solution in an amount from 0.01 to 0.10 per cent.

WILLIAM B. PRICE.